United States Patent [19]
Verhoeven

[11] 3,940,226
[45] Feb. 24, 1976

[54] APPARATUS FOR DISPENSING DOUGH IN A PATTERN UTILIZING MOVEABLE NOZZLES

[75] Inventor: Albert F. L. Verhoeven, Grand Rapids, Mich.

[73] Assignee: Werner Lehara, Inc., Grand Rapids, Mich.

[22] Filed: July 2, 1973

[21] Appl. No.: 375,667

[52] U.S. Cl. ............................ 425/375; 425/243 X
[51] Int. Cl.² ........................................ A21C 11/16
[58] Field of Search ............ 425/375, 377; 239/587

[56] References Cited
UNITED STATES PATENTS

| | | | |
|---|---|---|---|
| 1,878,322 | 9/1932 | Preston et al. | 425/375 X |
| 1,903,570 | 4/1933 | Kremmling | 425/375 X |
| 2,291,457 | 7/1942 | Farmer | 425/375 X |
| 2,478,199 | 8/1949 | Lyon | 425/375 X |
| 3,396,431 | 8/1968 | Kovach et al. | 425/243 X |
| 3,612,408 | 10/1971 | Halleman | 239/587 |
| 3,709,644 | 1/1973 | Farrell | 425/245 X |

Primary Examiner—Ronald J. Shore
Assistant Examiner—David S. Safran
Attorney, Agent, or Firm—Price, Heneveld, Huizenga & Cooper

[57] ABSTRACT

A plurality of compressible chambers dispense measured amounts of dough through one or more nozzles suspended universally from the bottom of each chamber for swivel movement relative thereto. The nozzles are interconnected by a plate movable in a plane to jointly rotate the nozzles simultaneously in a circuitous manner as the dough is dispensed to provide a predetermined swirl design of the dough as it is dispensed on the moving conveyor. The plate includes openings through which the nozzles extend and are universally connected. The movement of the plate is responsive to a rotating cam which eccentrically drives a follower on the plate to dictate the preselected swirl design.

15 Claims, 11 Drawing Figures

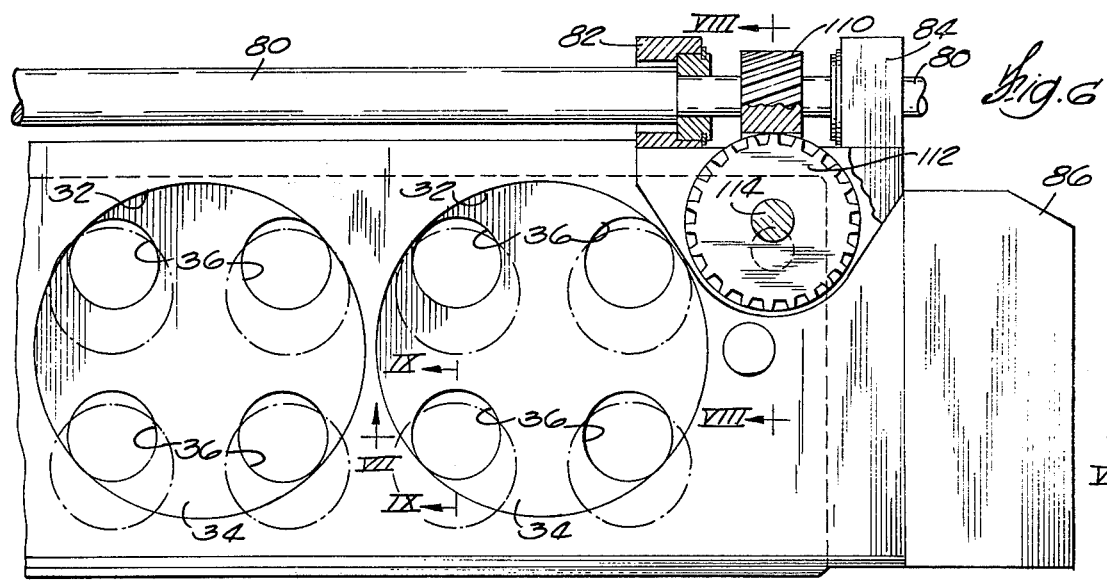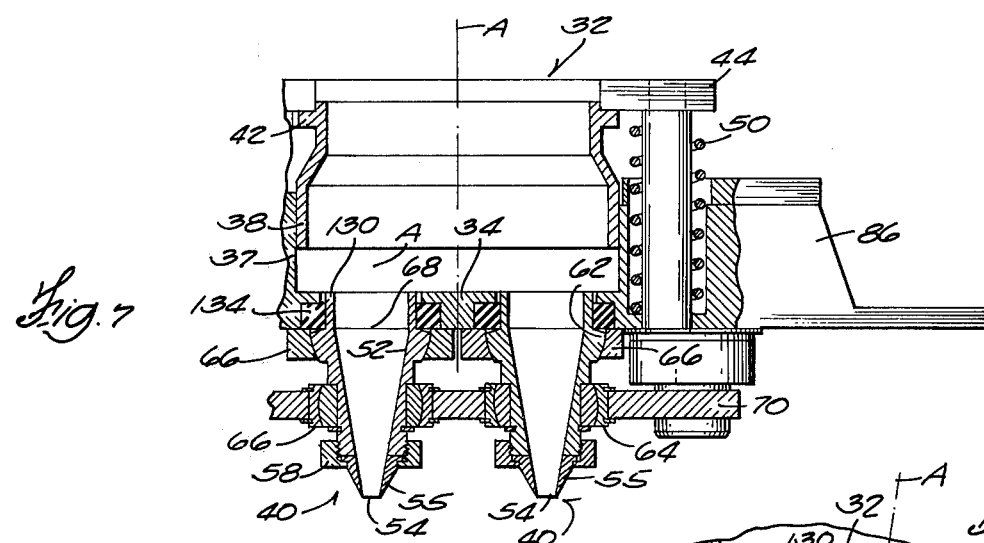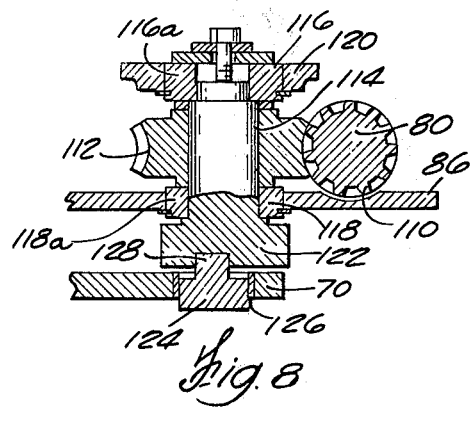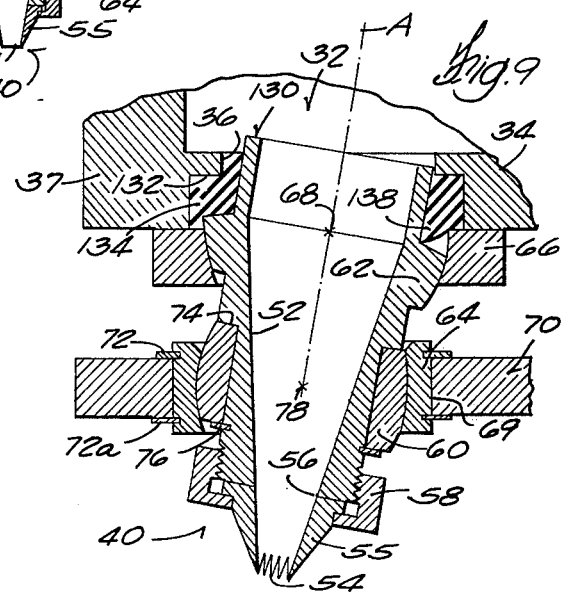

APPARATUS FOR DISPENSING DOUGH IN A PATTERN UTILIZING MOVEABLE NOZZLES

BACKGROUND OF THE INVENTION

1. Field of Invention

This invention relates to a method and apparatus for automatically dispensing measured amounts of food and particularly for dispensing predetermined amounts of unbaked dough onto a moving conveyor in a commercial oven assembly.

2. Description of The Prior Art

Large commercial bakeries depend on highly sophisticated conveyors, ovens and related mechanisms for baking and packaging literally thousands of cookies or the like in a single day. In spite of the current level of automated equipment, however, it has proven extremely difficult to massproduce what are known as "swirl" cookies. Swirl cookies are those having a very attractive arcuate pattern generally ascending to a peak in a shape similar to an Archimedes spiral.

The general method and approach of the prior art is to rotate a nozzle having a configurated opening above the support conveyor to develop a circular or cylindrical pattern to the dough being dispensed. If each locus point were traced however, a plurality of circles would be developed about the axis of rotation since each locus was maintained at a constant radius of rotation. This mechanism would not therefore create a swirl having a radius changing about the axis of rotation. In addition those machines required individual drive mechanisms for each nozzle and was therefore extremely expensive.

One alternative known prior art mechanism achieves a swirl by rotating the whole die mechanism through a desired path. This type of mechanism requires a substantial drive which is far too complex and expensive. In addition, its size and complexity has prevented ready desired speed or rate on a mass-production basis. Thus, there is a need in this art for an improved dough dispensing device capable of producing a plurality of preselected swirl designs on a mass-production basis.

SUMMARY OF THE INVENTION

In the preferred embodiment of the invention, cookie dough or the like is fed from a hopper into a bank of piston-like chambers which include one or more nozzles depending therefrom. Dough in measured amounts is deposited onto a moving conveyor beneath the nozzles by piston-like action of the chambers which compress to urge the measured amount of dough through the nozzles.

In accordance with the invention, the nozzles are universally mounted to the chambers so that the nozzle axes along which the dough is dispensed can be swiveled freely at an angle to a generally vertical axis. The nozzle axis is projected at a constant angle to the vertical subscribes the evolution of a cone. The nozzles are interconnected by a planar means preferably in the form of a plate through which the nozzles extend and are universally connected to the plate so that as the plate is driven arcuately in a plane, the nozzles are likewise rotated simultaneously to deposit dough smoothly in a swirled design.

In the preferred embodiment, each locus point of each nozzle as it is rotated changes its position relative the axis of rotation so that a plurality of swirls similar to an Archimedes spiral are developed. Depending on the degree and direction of rotation, an infinite number of very artistic swirl designs for cookies can be achieved in an economic and very fast mass-produced basis not heretofore possible.

DESCRIPTION OF THE DRAWINGS

FIG. 6 is a fragmentary cut-away view similar to FIG. 5 with the nozzles removed;

FIG. 7 is a fragmentary cross-sectional view taken along line VII—VII of FIG. 6;

FIG. 8 is a fragmentary cross-sectional view taken along line VIII—VIII of FIG. 6;

FIG. 9 is a fragmentary cross-sectional view taken along line IX—IX of FIG. 6;

DESCRIPTION OF THE PREFERRED EMBODIMENTS

Figure 1:
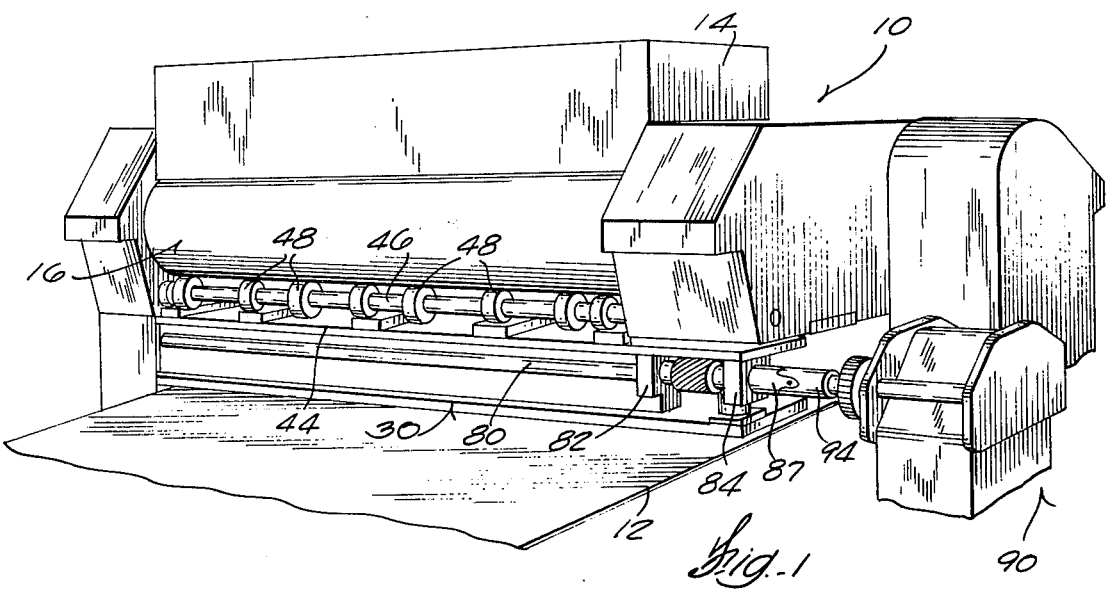
FIG. 1 is a fragmentary perspective view of a dough dispensing device utilizing the invention.

Referring now to the drawings in detail, FIG. 1 illustrates the machinery 10 in which the dough dispensing device 30 (FIG. 4) is mounted for dispensing a plurality of predetermined volumes of dough onto moving conveyor 12 preparatory to baking same.

The machinery 10 includes a hopper 14 in which the dough is initially deposited. Rotatably mounted beneath hopper 14, are a pair of feed rolls, only one roll 16 of which is shown in FIG. 1. These feed rolls form a nip through which dough is fed into a bank of cylindrically shaped injection chambers 32 illustrated in FIGS. 5–7. The chambers 32 are interconnected together by a support plate 86 referred to as a compression plate for reasons described hereinafter. When inserted in machinery 10, the orientation of the chambers is as shown in FIG. 7, the feeding rolls being positioned just above the upper open end of chambers 32 so that by rotation of the rolls each chamber 32 is loaded by compression with dough.

Briefly, with reference to FIG. 7, the bottom of each chamber is closed by a bottom plate 34 having a plurality of openings 36 (FIG. 6) in which are anchored a respective plurality of nozzles 40. The dough loaded in each chamber 32 is dispensed downwardly onto conveyor 12 through the plurality of nozzles 40 which are actuated in a novel fashion as described hereinafter.

The annular side walls of each chamber 32 includes an annular wall portion 37 (FIG. 7) secured to compression plate 86 and a movable wall portion 38 telescopically fitted within wall 37 and movable longitudinally in the direction of the generally vertical axis "A" of chamber 32. The movable wall 38 includes an annular shoulder 42 in abutment with a plate 44. Plate 44 (FIG. 1) is mounted within machinery 10 immediately beneath a rotatable shaft 46 having mounted thereon a plurality of cams 48. These cams are eccentric such that when the shaft 46 is rotated, the cam lobe portion (not shown) of each cam drives plate 44 upwardly to lock plate 44 to the machine.

Referring to FIG. 7, compression plate 86 is based by spring 50 at each end into the expanded position illustrated in FIG. 7. When compression plate 86 is pushed upwardly by a cam mechanism within the machine (not shown) a measured amount of dough is deposited on conveyor 12 through each nozzle 40. The cam engagement in the machine for upward movement of plate 86 is released rapidly so that springs 50 provide a quick return of compression plate 86 to the position shown creating a vacuum in chamber 32 and the passageway portion 52 of each nozzle 40 causing a very effective vacuum cutoff at the nozzle discharge orifice 54.

Referring now to FIGS. 7 and 9, each nozzle 40 includes a flow passageway 52 which tapers downwardly to a configurated discharge orifice 54. The discharge portion 55 of the nozzle is in the form of a nose portion which is held in abutment with the forward end 56 of nozzle 40 by a threaded cap 58. This permits nose portions of different design and dimension to be readily attached to the nozzle 40 depending upon the desired configuration of the dough to be deposited on support 12. Thus, cap 58 is simply threaded off the forward end 56 and the desired nose portion 55 is inserted by rethreading it back on.

The outer periphery of each nozzle 40 includes a pair of longitudinally spaced annular ring portions 60 and 62 which are encapsulated within respective socket portions 64 and 66. The ball and socket relationship between rings 60, 62 and sockets 64, 66 permits movement of nozzle 40 rotationally or pivotally about a vertical axis or circumferentially about the nozzle axis "AA" as well as pivotal or swivel movement B passing through the locus point 68 (FIGS. 9 and 11) which is the center of FIG. 62. Actually, the nozzles do not rotate circumferentially in sockets 64 and 66 since the compression force exerted on the dough seats the nozzle firmly therein although it will pivot. This facilitates the swirl effect as illustrated hereinafter.

The socket portions 66 are anchored to the bottom wall 34 of chamber 32 such that each nozzle 40 is free to rotate pivotally about locus point 68 shown in FIG. 9. The socket portions 64 are held within openings 69 formed in a movable plate 70 spaced from the bottom 34 of chamber 32. The actuation of plate 70 will be described in more detail hereinafter.

The annular socket rings 64 are held within openings 69 by a pair of snap rings 72 and 72a shown in FIG. 9. The ball ring 62 is formed integrally with nozzle 40 while ball ring 60 is preferably separate therefrom. It slips over the forward end 56 of nozzle 40 and seats against a shoulder 74 and is held securely to the nozzle body by a snap ring 76. The nozzle can be quickly dismantled for cleaning. Release of snap ring 76 permits removal of socket portion 64 and ball ring 60 after cap 58 is removed. The rings 72, 72a also index the nozzle relative compression plate 86 and movable plate 70. The entire nozzle can be removed upwardly through opening 36 by removing seal 134 (FIG. 9) and canting the nozzle so that ball ring 62 clears opening 36. Socket portion 66 may also be removably connected to compression plate 86 by an appropriate mechanica fastener.

The ball-socket formed by ring 60 and socket 64 likewise permits free rotation pivotally about vertical axis BB which passes through the ring center 78. Each nozzle is also capable of swivel movement about locus 78 at an angle of incline to vertical axes B or BB in the same manner that the nozzle is rotatable and pivotal about locus point 68 described above. However, the securement of nozzles 40 in two separate ball-socket arrangements causes an inter-relationship in the free movement thereof which will be described hereinafter.

As will be described hereinafter, the controlled movement of each nozzle 40 simultaneously in joint action with the remaining nozzles is provided by the controlled movement of plate 70 which is movable within the plane of the plate. This movement of plate 70 relative to the remainder of dispensing device 30 provides a predetermined circuitous swirl design of the dough as it is dispensed through each nozzle.

Figure 4:
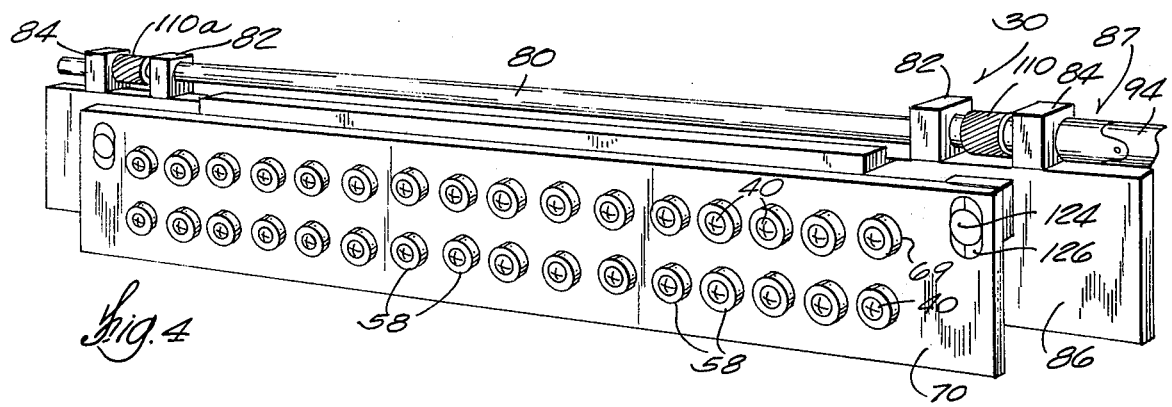
FIG. 4 is a perspective view illustrating the underside of the bank of nozzles.
Figure 5:
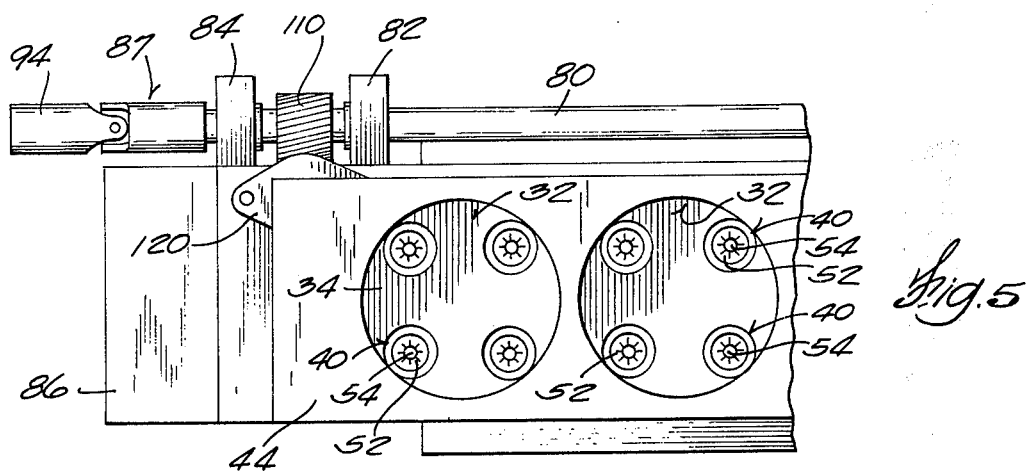
FIG. 5 is a fragmentary top view of the bank of nozzles illustrating the injection chambers of the invention.

Referring now in detail to FIG. 4, the device 30 is illustrated in perspective rotated so that it is viewed from the bottom which would normally be facing downwardly within machinery 10. The movable plate 70 is illustrated in FIG. 4 as is the plurality of nozzles 40 which protrude through each respective opening 69 in plate 70. The bank of nozzles extends widthwise over conveyor belt 12 to deposit individual amounts of dough along the entire width of the belt. FIG. 5 illustrates the device 30 fragmentarily from the rear also in the rotated position of FIG. 4. Thus, the orientation of each chamber 32 is illustrated showing four nozzles extending downwardly from each bottom wall 34 of chamber 32 spaced radially and circumferentially equal distances. It will be appreciated that any practical number of nozzles could be suspended from each chamber and there may be instances where only one nozzle or one chamber is used. The sizes could easily be varied.

Referring to FIGS. 4–6, a drive shaft 80 is mounted in a pair of spaced bearings 82 and 84 anchored to each end of compression plate 86. Compression plate 86 also serves as a mounting plate and is receivable within a pair of guide tracks (not shown) in the machinery 10 so that the entire device 30 can be easily inserted over conveyor 12 or removed from the machinery for repair or cleaning. The drive shaft 80 illustrated in FIGS. 1 and 4 is releasably connected through a universal joint 86 to a drive mechanism 90 illustrated in FIGS. 1 and 2.

Figure 2:
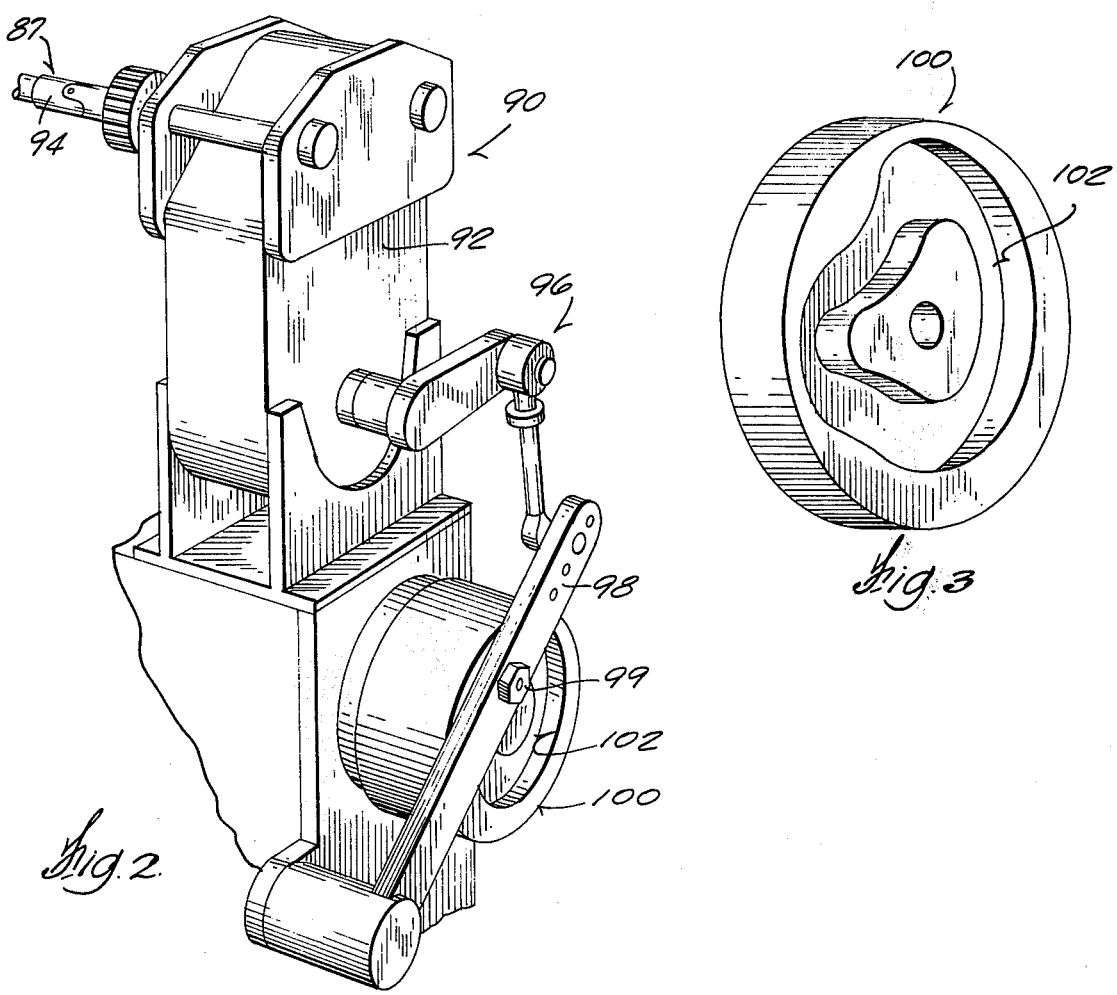
FIG. 2 is a fragmentary perspective view of the drive mechanism for actuating the device of the invention.
Figure 3:
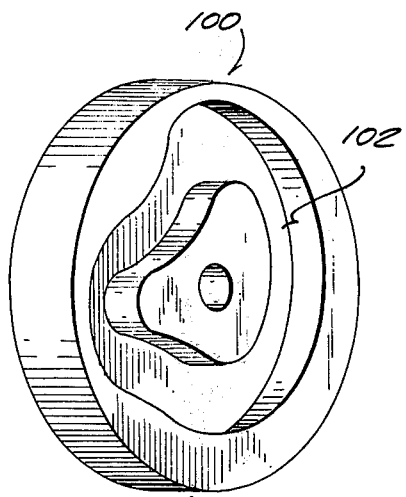
FIG. 3 is a perspective view of a barrel cam forming part of the drive mechanism.

The drive mechanism 90 illustrated in FIG. 2 is for the most part conventional and need not be described in detail. A gear reduction box 92 has an output shaft 94 which is connected to the input end 87 of shaft 80 when the dispensing device 30 is properly indexed within machinery 10. The movement of output shaft 94 is dictated by an input crank mechanism 96 which is connected to a cam follower arm 98. A cam follower (not shown) is adjustably bolted to arm 98 by a bolt 99 for cooperative engagement with a barrel cam 100 illustrated in FIGS. 2 and 3. Barrel cam 100 is rotated at a given speed and has a cam face 102 which drives the cam follower causing reactive movement in cam follower arm 98 resulting in eventual controlled rotation of output shaft 94. The configuration of cam face 102 is selected to provide the desired rotational output and hence drive of drive shaft 80 which controls the movements of movable plate 70 in a way which will be described hereinafter. The movement of plate 70 results in the desired swivel movement of nozzles 40 simultaneously with each other to provide the desired swirl pattern of the dough being dispensed therethrough.

Referring to FIGS. 6 and 8, as shaft 80 is rotated, a helical gear 110 mounted on shaft 80 is rotated therewith. Referring briefly to FIG. 4, it can be seen that a pair of helical gears 110 and 110a are provided on each end of the dispensing device 30 providing simultaneously driving movement of plate 70 through two cam drives although only one cam drive mechanism will be described in detail. Helical gear 110 is in mesh engagement with a second gear 112 illustrated in FIGS. 6 and 8. Gear 112 is anchored on a shaft 114 which is rotated with gear 112 as it is driven by helical gear 110. Shaft 114 shown enlarged in FIG. 8 is mounted in bearings 116, 116a and 118, 118a between the compression plate 86 and a bearing plate 120 illustrated in FIGS. 5 and 8. A disc 122 (FIG. 8) is secured to the front end of shaft 114 and has an opening which faces movable plate 70 and is positioned eccentrically with respect to the axis of shaft 114. A follower 124 is positionable within an opening 126 in movable plate 70 and anchored relative thereto, follower 120 including a projecting shaft portion 128 which fits within the opening of cam disc 122 such that as shaft 114 is rotated, cam disc 122 and follower 124 along with plate 70 are rotated in a circle having a radius equal to the magnitude of the displacement of the axis of cam follower 24 from the axis of shaft 114. This will cause resultant circular movement of plate 70 within the plane of the plate causing each nozzle 40 to react simultaneously in phase with each other for arcuate rotation about locus point 68 illustrated in FIG. 9.

Figure 11:
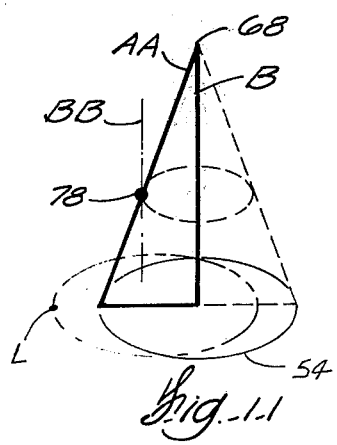
FIG. 11 is a schematic view of the movement of the nozzle driven in accordance with the invention.

Referring to FIG. 11, as each nozzle 40 is rotated simultaneoulsy with the movement of plate 70, the axis "AA" of each nozzle as it is pivoted relative locus point 68 circumscribes the evolution of a cone, the dimensions of which depend upon the magnitude of displacement or eccentricity of the cam disc as well as the length of the nozzle measured from locus point 68 to the discharge orifice 54 shown schematically in FIG. 11. Both of these distances are subject to adjustment by replacement of cam disc 122 or replacement of a different nose portion 55 of varied length. It will be readily appreciated however that as plate 70 is moved in accordance with the above description, nozzles 40 illustrated therein will project the evolution of a cone rotating the axis of the nozzles at an angle to the vertical axis B. The nozzle itself however will not rotate circumferentially in socket 66 due to the compression force generated by chamber 32. Thus, each locus of the nozzles in effect generates a circular evolution different than each other locus thereby producint a plurality of preselected swirls similar to the spiral of Archimedes when viewed as a finished product. The evolution of discharge orifice 54 illustrated in FIG. 9 is shown circularly in phantom in FIG. 6 which illustrates the movement of only the axis of the discharge end of each nozzle 40 if movable plate 70 is rotated in a constant direction and magnitude. The evolution of a second locus point L is shown also in FIG. 11 illustrating the circular revolution about a different center point thereby developing the swirl effect.

It will be appreciated that in developing a variety of desired swirl designs for cookies, the evolution will not always be a continuous circle. Thus, shaft 80 is rotated through various angles of rotation in a direction both clockwise and counter-clockwise to dispense the dough in a precise preselected swirl design.

Referring briefly once more to FIGS. 7 and 9, the upper inlet end 130 of nozzles 40 projects up to a position flush with the bottom 34 of each container 32. As each nozzle is rotated, the wall of the nozzle will rotate and pivot above and below the plane defined by the upper surface of bottom 34. Proper clearance must be provided and as noted in FIG. 9, an undercut 132 is provided within bottom wall 34 to permit ball ring 62 to likewise obtain clearance. To eliminate leakage of dough between the spacing of the upper end of nozzles 40 and the bottom of each container, a sealing ring 134 is use to fill the spacing provided by undercut 132. As each nozzle is rotated and deflected, the respective portion of ball ring 62 causes compression of the ring in one direction causing a reactionary bulge 136 (FIG. 9) in the upper direction with a corresponding downward deflection in bulge 138 in the opposite direction. This seal prevents leakage of the dough intermediate the wall of the nozzle and the container.

Figure 10:
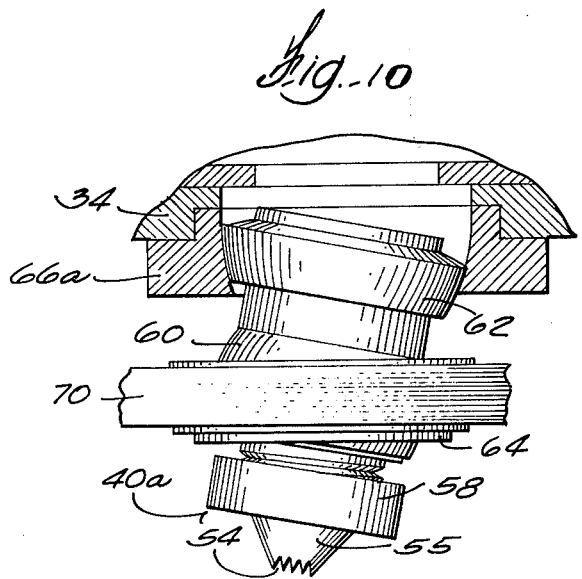
FIG. 10 is a fragmentary partial cross section view similar to FIG. 9 of an alternative embodiment.

While the seal 134 works adequately, it has been found that it can be eliminated resulting in a savings not only in the cost of the seal but in reducing the material content of each nozzle 40. Referring to FIG. 10, an alternative embodiment is illustrated wherein like numerals are utilized with modified structure identified by adding the suffix "a".

The only change in the embodiment is that nozzle 40a is modified to the extent that it is shortened and annular socket 66a is modified to fill the void left by the absence of sealing ring 134. This fills the spacing beneath undercut 132. It has been found that the close tolerance between ring 62 and socket 66a is sufficient to prevent leakage of dough between the movable surfaces. The resultant benefit is a simpler and cheaper design.

Although but two embodiments have been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

The embodiment of the invention in which an exclusive property or privilege is claimed are defined as follows:

1. Apparatus for dispensing dough in a predetermined pattern onto a conveyor or the like comprising, in combination: a support; one or more dispensing chambers fixed to said support, said chambers defining a conduit through which measured amounts of dough are dispensed, said chambers being mounted to said support whereby flow through said chambers is in a generally vertical downward direction, each of said chambers including a bottom having one or more openings; one or more nozzles depending from said bottom in a generally vertical direction and having a portion extending into said bottom openings and being mounted relative said chamber bottom by a first mounting means whereby said nozzle can be pivoted circuitously in a swivel fashion such that the axis of the nozzle is at an angle to the vertical, said first mounting means being an annular ring means projecting outwardly from said nozzle receivable in an annular socket on said support forming a ball and socket joint; dough being dispensed through said one or more nozzles along the axis of each nozzle onto the conveyor or the like; means interconnecting said one or more nozzles jointly together, and a drive means for moving said interconnecting means whereby said nozzles are driven simultaneously together relative said support whereby the axis of said nozzles is swiveled at a preselected angle of incidence to the axis of said conduit such that the dough is deposited on the conveyor or the like in a preselected swirl design.

2. Apparatus for dispensing dough in a predetermined pattern onto a conveyor or the like comprising, in combination: a support; one or more dispensing chambers fixed to said support, said chambers defining a conduit through which measured amounts of dough are dispensed, said dispensing chambers being mounted to said support whereby flow through said chambers is in a generally vertical downward direction, each of said chambers including a bottom having one or more openings; one or more nozzles swivelly connected to said chambers and depending from the bottom of said chambers in a generally vertical direction and having a portion extending into said bottom openings and being mounted relative said chamber bottom by a first mounting means whereby said nozzle can be pivoted circuitously in swivel fashion such that the axis of the nozzle is at an angle to the vertical; dough being dispensed through said one or more nozzles along the axis of each nozzle onto the conveyor or the like; means interconnecting said one or more nozzles jointly together, wherein said interconnecting means is a plate spaced from said support, said plate having a plurality of spaced openings through which said nozzles extend; and a drive means for moving said plate circuitously in the plane of said plate to drive said nozzles simultaneously together relative said plate and support whereby the axis of said nozzles is swivelled at a preselected angle of incidence to the axis of said conduit such that the dough is deposited on the conveyor or the like in a preselected swirl design.

3. Apparatus according to claim 2 wherein said nozzles are anchored to said plate by a second mounting means comprising an annular ring means projecting outwardly from said nozzle and receivable in an annular socket on said plate forming a ball and socket joint whereby the discharge opening of said nozzle is moved in a plane parallel to the plane of said plate as said drive means circuitously drives said plate.

4. Apparatus according to claim 3 wherein the projection of said nozzle as it is driven circuitously by said plate defines a segment of a cone, the apex being the axis of rotation of said first mounting means and the base being in the plane of movement of the discharge opening of said nozzle.

5. Apparatus according to claim 2 wherein said drive means is comprised of a cam rotatable on said support and a cam follower mounted on said plate, the axis of said follower being displaced from the axis of said cam whereby said follower is driven electrically causing circular movement of said plate within the plane of said plate.

6. Apparatus according to claim 5 wherein said cam is rotated intermittently in a clockwise and counterclockwise direction of selected angular durations causing a reactionary circuitous movement of said nozzles as dough is dispensed through said nozzles to form a preselected swirl design of the dough on a conveyor or the like.

7. Apparatus for dispensing dough in a predetermined pattern onto a surface comprising, in combination: a support; a dough dispensing chamber secured to said support; one or more nozzles connected to the bottom of said chamber for dispensing dough from said chamber onto said surface, said nozzles mounted to said chamber for swivel movement relative said chamber and said support, the axis of each nozzle being rotatable at an angle to the direction of movement of dough from said chamber into said nozzles; plate means interconnecting said one or more nozzles jointly together, said plate means having a plurality of spaced openings through which each of said one or more nozzles extend; and drive means for moving said plate means circuitously with the plane of said plate means, said drive means when actuated driving said one or more nozzles circuitously by said plate means simultaneously together relative both said plate and said support causing said nozzles to deposit dough onto said surface in a preselected swirl design.

8. Apparatus according to claim 7 wherein said nozzles are anchored to said plate in said openings by a mounting means whereby said nozzle is moved jointly with said plate but will swivel relative said plate.

9. Apparatus according to claim 8 wherein said mounting means includes an annular ring means projecting outwardly from said nozzle and receivable in an annular socket on said plate forming a ball and socket joint whereby the discharge opening of said nozzle is moved in a plane parallel to the plate of said plate as said drive means moves said plate.

10. Apparatus according to claim 9 wherein said plate is driven in a circuitous fashion, each of said nozzle axes being likewise circuitously driven to define a segment of a cone the apex being at the connection of said nozzle to said chamber and the base being in the plane of movement of the discharge opening of said nozzle.

11. Apparatus according to claim 8 wherein the drive means includes a cam rotatable on said support and a cam follower on said plate, the axis of said follower being displaced from the axis of said cam whereby said follower is driven in a circle causing circular movement of said plate within the plane of said plate.

12. Apparatus according to claim 11 wherein said dispensing chamber includes a first portion mounted stationary to said support and a second portion movable relative said support and first portion whereby the volume of said chamber can be arbitrarily decreased forcing a predetermined volume of dough to be dispensed out of said chamber through said nozzles.

13. Apparatus according to claim 11 wherein bias means are provided to rapidly return said chamber to its original volume when said volume reducing means is released to cause a partial vacuum within said chamber cutting off the flow abruptly at the discharge orifice of said nozzles.

14. Apparatus according to claim 12 wherein said apparatus includes a plurality of dough dispensing chambers, each chamber having one or more nozzles connected to the bottom thereof, said plate interconnecting all of said nozzles for joint movement relative said support and plate.

15. Apparatus for dispensing dough in a predetermined pattern onto a conveyor or the like comprising, in combination: a support; one or more dispensing chambers fixed to said support, said chambers defining a conduit through which measured amounts of dough are dispensed; one or more nozzles swivelly connected to said chambers, dough being dispensed through said one or more nozzles along the axis of each nozzle onto the conveyor or the like; plate means interconnecting said one or more nozzles jointly together, said plate means having a plurality of spaced openings, said nozzles extending through said openings; and a drive means for moving said plate means circuitously in the plane of said plate means, whereby said nozzles are driven circuitously by said plate means simultaneously together relative both said plate and support whereby the axis of said nozzles is swiveled at a preselected angle of incidence to the axis of said conduit such that the dough is deposited on the conveyor or the like in a preselected swirl design.

* * * * *

UNITED STATES PATENT AND TRADEMARK OFFICE
CERTIFICATE OF CORRECTION

PATENT NO. : 3,940,226
DATED : February 24, 1976
INVENTOR(S) : Albert F. L. Verhoeven It is certified that error appears in the above-identified patent and that said Letters Patent are hereby corrected as shown below:

Column 7, line 46;
After "nozzle" insert --- axis ---;

Column 7, line 55;
"electrically" should be --- eccentrically ---;

Column 8, line 11;
"with" should be --- within ---;

Column 8, line 26;
"plate" first occurrence should be --- plane ---.

Signed and Sealed this eighth Day of June 1976

[SEAL]

Attest:

RUTH C. MASON
Attesting Officer

C. MARSHALL DANN
Commissioner of Patents and Trademarks